United States Patent [19]

Harger et al.

[11] Patent Number: 5,388,476
[45] Date of Patent: Feb. 14, 1995

[54] GEARSHIFT MECHANISM

[75] Inventors: James R. Harger, Columbia; David L. Murray, Lee's Summit, both of Mo.

[73] Assignee: Agco Corporation, Duluth, Ga.

[21] Appl. No.: 77,572

[22] Filed: Jun. 15, 1993

[51] Int. Cl.$^6$ .................................. B60K 20/00
[52] U.S. Cl. .................................. 74/473 R; 74/475
[58] Field of Search ..................... 74/473 R, 475

[56] References Cited

U.S. PATENT DOCUMENTS

| | | | |
|---|---|---|---|
| 3,495,473 | 2/1970 | Willis | 74/473 R |
| 3,585,319 | 6/1971 | Payerle | 200/6 A |
| 3,770,915 | 11/1973 | Bennett et al. | 200/6 A |
| 3,795,157 | 3/1974 | Campbell et al. | 74/473 R |
| 3,805,640 | 4/1974 | Schneider et al. | 74/645 |
| 3,814,871 | 6/1974 | Osika | 200/6 A |
| 3,824,354 | 7/1974 | Anderson et al. | 200/1 R |
| 3,898,397 | 8/1975 | Devore et al. | 200/6 A |
| 3,927,285 | 12/1975 | Frost et al. | 200/6 A |
| 3,975,970 | 4/1976 | Elfes et al. | 74/473 R |
| 3,987,686 | 10/1976 | Paplaski | 74/476 |
| 3,994,184 | 11/1976 | Osborn | 74/473 R |
| 4,026,048 | 5/1977 | Hill et al. | 37/42 R |
| 4,068,540 | 1/1978 | Beckerman | 74/476 |
| 4,085,833 | 4/1978 | Papasideris | 192/4 B |
| 4,137,792 | 2/1979 | Ceccano | 74/473 R |
| 4,181,827 | 1/1980 | Diepeveen | 200/6 A |
| 4,244,122 | 1/1981 | Hetrick | 37/41 |
| 4,297,542 | 10/1981 | Shumway | 200/6 A |
| 4,353,177 | 10/1982 | Hoekstra | 37/234 |
| 4,361,060 | 11/1982 | Smyth | 74/752 A |
| 4,425,620 | 1/1984 | Batcheller et al. | 364/424.1 |
| 4,442,730 | 4/1984 | Snoy | 74/475 |
| 4,469,330 | 9/1984 | Asher | 273/148 B |
| 4,569,255 | 2/1986 | Holmes | 364/424.1 |
| 4,590,339 | 5/1986 | Scott-Jackson et al. | 200/6 A |
| 4,598,374 | 7/1986 | Klatt | 364/424.1 |
| 4,607,159 | 8/1986 | Goodson et al. | 250/221 |
| 4,610,179 | 9/1986 | Parker | 74/335 |
| 4,621,328 | 11/1986 | Arai et al. | 364/424.1 |
| 4,646,895 | 5/1987 | Horsch | 192/87.13 |
| 4,690,008 | 9/1987 | Klatt | 74/336 R |
| 4,718,307 | 1/1988 | Yabe et al. | 74/335 |
| 4,782,327 | 11/1988 | Kley et al. | 340/365 P |
| 4,794,388 | 12/1988 | Matthews | 340/731 |
| 4,843,902 | 7/1989 | Patton et al. | 74/335 |
| 4,855,913 | 8/1989 | Brekkestran et al. | 364/424.1 |
| 4,905,530 | 3/1990 | Stehle et al. | 74/335 |
| 4,913,004 | 4/1990 | Panoushek et al. | 74/335 |
| 4,926,172 | 5/1990 | Gorsek | 341/20 |
| 4,928,544 | 5/1990 | Markyvech et al. | 74/335 |
| 4,991,454 | 2/1991 | Bulgrien | 74/335 |
| 5,036,718 | 8/1991 | Bulgrien | 74/335 |
| 5,307,013 | 4/1994 | Santos et al. | 324/207.2 |

OTHER PUBLICATIONS

The 4994 Tractor Steering and Transmission Control System, Brian J. Bischel, Paper No. 841153 no date.
User-Friendly Electronic Powershift Transmission Controls, Garth H. Bulgrien, Ford New Holland, Paper No. 911831 Sep. 1991.

*Primary Examiner*—Dirk Wright
*Attorney, Agent, or Firm*—Harness, Dickey & Pierce

[57] ABSTRACT

An in-line gearshift mechanism for use with a powershift transmission of an agricultural vehicle. The gearshift mechanism includes a shift lever assembly, a shifter plate and a switch plate each separated by a plurality of spacers and secured as an integral unit to a frame portion of an interior of the agricultural vehicle. The shifter plate includes a plurality of in-line detent positions defining forward upshift, forward, forward downshift, neutral, reverse downshift, reverse and reverse upshift detent positions at which the shift lever may be positioned. The shift lever includes a gear encoder plate on which a plurality of switch activating elements are positioned. As the shift lever is moved between the above-mentioned detent positions, the switch activating elements selectively actuate selected ones of a plurality of reed switches disposed on the switch plate. The reed switches generate signals indicative of the position of the shift lever, which may then be used to inform an external controller of the position of the shift lever and thus the desired operation (i.e., forward upshift, shift to neutral, etc.). In the preferred embodiment a neutral detection limit switch is also included which is actuated when the shift lever assembly is placed in the neutral position. The preferred embodiment also includes a throttle lever for adjusting the speed of an engine of the agricultural vehicle.

16 Claims, 9 Drawing Sheets

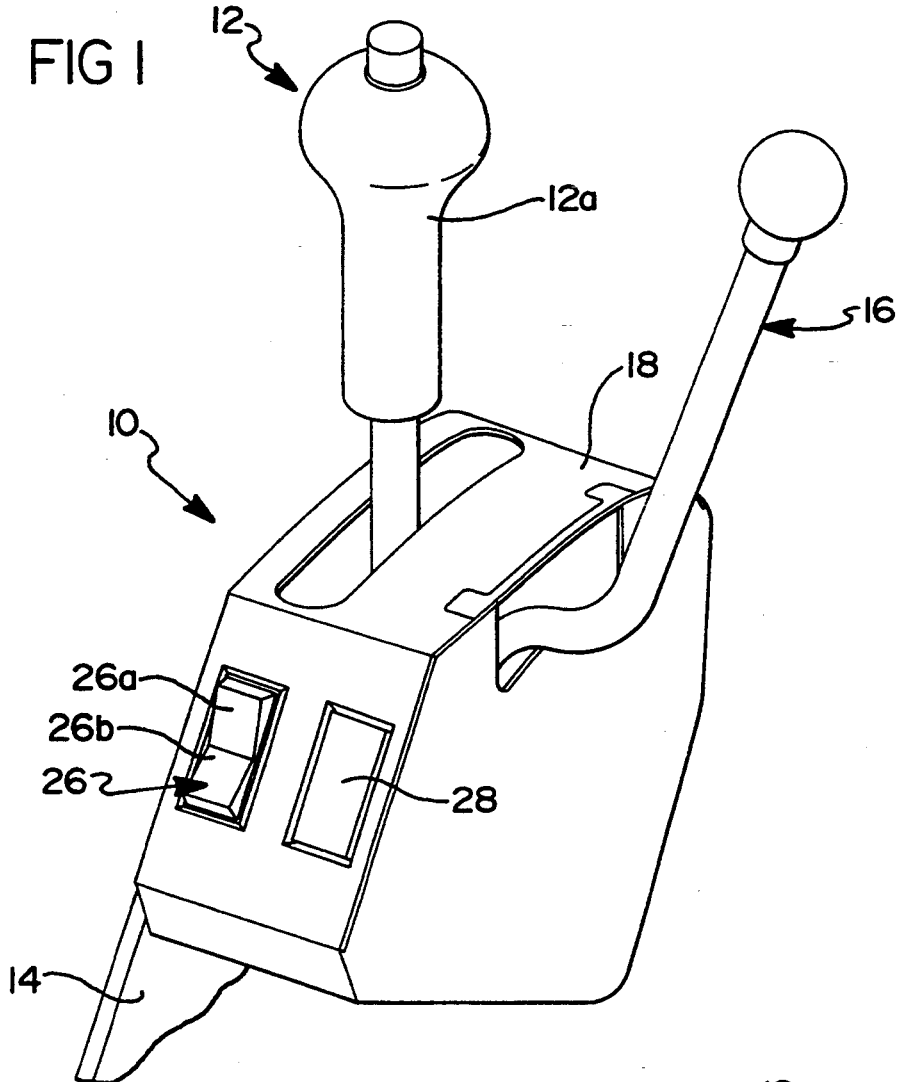
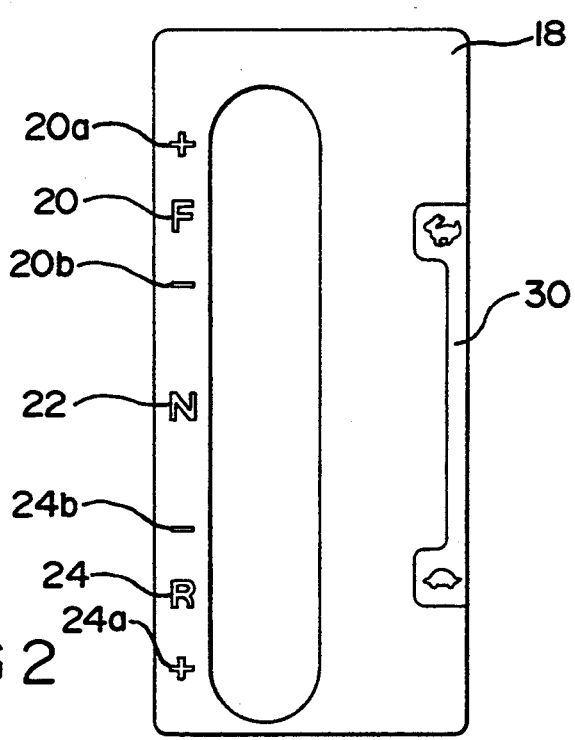

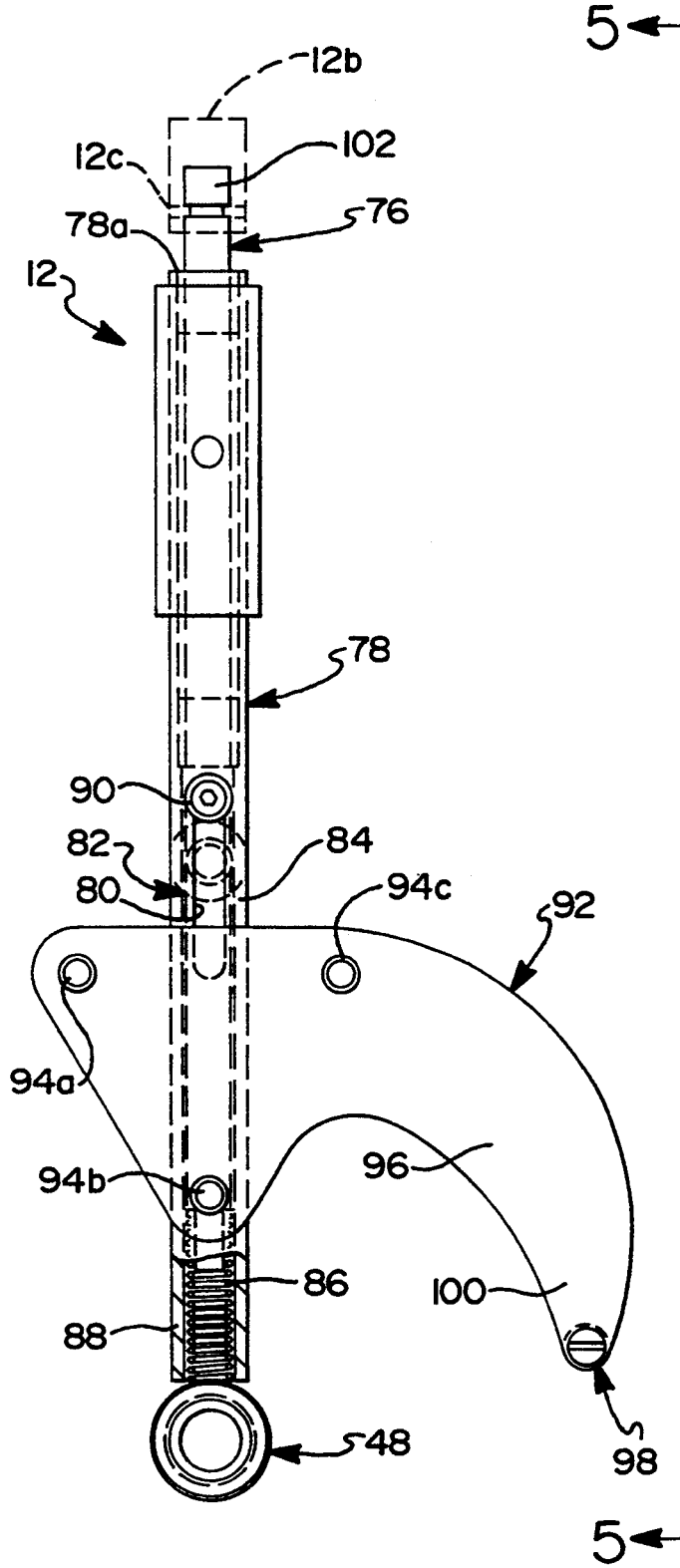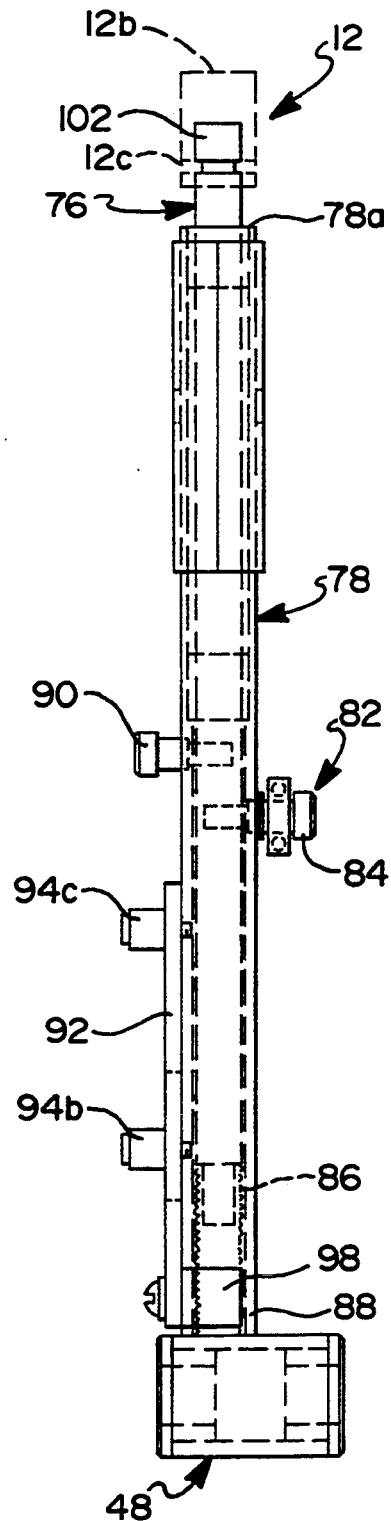
FIG 4
FIG 5

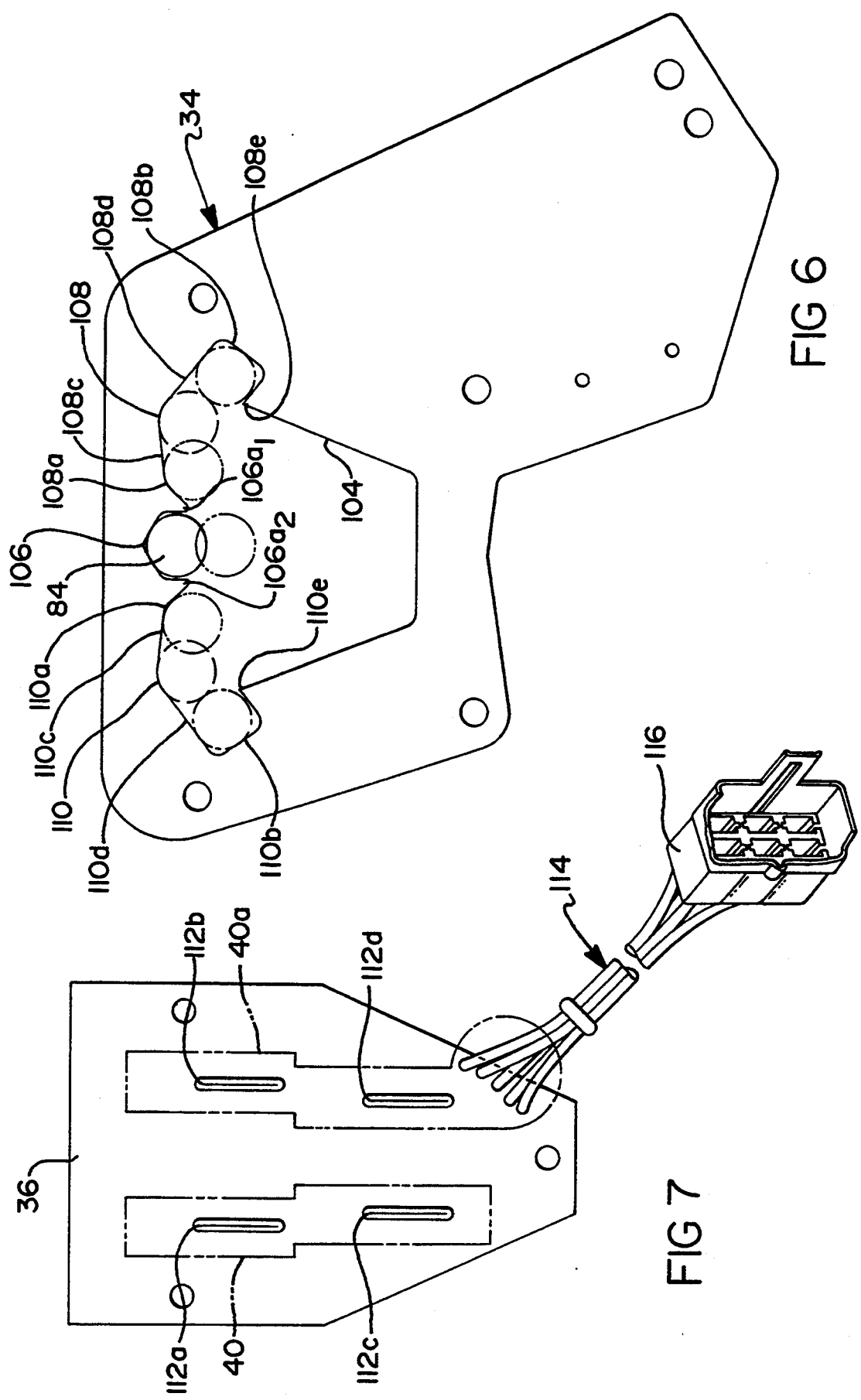

GEARSHIFT MECHANISM

BACKGROUND OF THE INVENTION

1. Technical Field

This invention relates to gearshift mechanisms and, more particularly, to an in-line gearshift mechanism for controlling the directional mode of operation and gear selection of a powershift transmission of an agricultural vehicle.

2. Discussion

Gearshift mechanisms are used in a wide variety of applications to allow an operator to control a transmission of a vehicle so as to select not only a directional mode of operation of the vehicle, but a specific gear in which the transmission of the vehicle is to be operated.

Traditionally, heretofore developed gearshift mechanisms have usually required shifting to be performed in an "H" pattern, or some variation thereof. Accordingly, when shifting from, for example, first forward gear to, for example, third forward gear, the operator is required to not only move the gearshift lever linearly but also perpendicularly for a brief period of travel, and then typically linearly again. Accordingly, many shifts between gears, or between directional modes of operation, require the operator to move the gearshift lever in two or three distinct directions. Even with direction "reverser" transmissions, where levers are moved generally in a straight path, multiple levers are required to accomplish multiple gear selection.

In many applications, particularly agricultural and off-road earth moving applications, frequent shifting is required by the operator. The multiple, distinct movements required by the traditional gearshift mechanisms can often add significantly to the fatigue of the operator over the course of several hours of operation of the vehicle. The requirement of moving the gearshift lever in several distinct directions to accomplish a gearshift is further more apt to cause the operator to unintentionally select an unwanted gear, which may in turn needlessly stress or damage the transmission and/or engine of the vehicle. Thus, there exists a definite need to provide a gear shift mechanism which provides shifting action (i.e., shift lever movement) in logical directions to accomplish directional mode changes, as well as upshifts and downshifts, all with a single gearshift lever and with in-line shift movements.

Accordingly, it is a principal object of the present invention to provide a gearshift mechanism which allows "in-line" shifting between forward, neutral and reverse modes of operation, as well as in-line shifting between all of the forward and all of the reverse gears of a powershift transmission.

It is still another object of the present invention to provide a gearshift mechanism having a gearshift lever which accomplishes upshifting or downshifting while in a forward mode of operation with only a relatively short "in-line", linear movement towards a forward upshift or a forward downshift position, and which similarly allows upshifting or downshifting while in the reverse mode of operation by simply moving the gearshift lever linearly, in an in-line fashion, momentarily to either a reverse upshift position or a reverse downshift position.

It is yet another object of the present invention to provide an in-line gearshift mechanism having a shift lever capable of shifting between a forward, a neutral and a reverse mode of operation in in-line fashion, and further for upshifting or downshifting while in the forward mode of operation in in-line fashion, and further where the gearshift mechanism includes means operably associated therewith for determining if in fact a downshift was desired by the operator when the gearshift lever moves through the forward downshift position, and whether in fact a reverse downshift was desired by the operator when the gearshift lever is moved through the reverse downshift position.

It is further an object of the present invention to provide a gearshift mechanism for accomplishing shifts between reverse, neutral and forward directional modes of operation, as well as upshifts and downshifts in each of the forward and reverse directional modes of operation, all in an in-line fashion with no perpendicular movement of the gearshift lever, and which further includes a throttle lever for allowing an operator to adjust an engine speed of the vehicle.

It is yet another object of the present invention to provide an in-line gearshift mechanism which may be easily and conveniently assembled as an integral unit to a frame portion of the vehicle.

SUMMARY OF THE INVENTION

The above and other objects are accomplished by an in-line gearshift mechanism in accordance with preferred embodiments of the present invention. The gearshift mechanism generally includes a shift lever, a shifter plate positioned closely adjacent the shift lever, and a switch assembly plate positioned closely adjacent the shift lever. The shift lever further includes detent rod means engageable by an operator and movable generally linearly relative to the shifter plate. The detent rod means includes a roller secured thereto which thus moves linearly in accordance with movement of the detent rod means. The shift lever also includes a gear encoder plate fixedly secured thereto having a plurality of switch activating means thereon.

The shifter plate further includes means forming a neutral detent (i.e., lock) position, a reverse detent position and a forward detent position, within which the roller may engage as the shift lever is moved linearly between detent positions associated with reverse, neutral and forward directional modes of operation.

In the preferred embodiments the shifter plate further includes positions defining forward upshift and forward downshift, as well as reverse upshift and reverse downshift. Accordingly, when the gearshift lever is moved linearly into one of the just-mentioned positions, a reverse upshift, reverse downshift, forward upshift or forward downshift can be accomplished. The shifter plate further includes portions which prevent an operator from unintentionally moving the gearshift lever into the forward upshift or reverse upshift positions while the detent rod means is fully engaged by the operator and the gearshift lever is being moved from the neutral to either the forward or reverse positions. Still further, the shifter plate includes portions which are positioned to momentarily engage a portion of the gearshift lever as the lever is moved between through the neutral position while shifting from forward to reverse or from reverse to forward, to thus provide tactile feedback to the operator to inform him/her that the neutral position is being passed through.

In the preferred embodiments the switch assembly plate includes a plurality of switch elements thereon which are responsive to the switch activating elements of the gear encoder plate. As the shift lever is moved linearly, the gear encoder plate, being secured thereto, moves therewith. The switch activating elements activate the switch elements on the switch assembly plate, which in turn generate signals representative of the position of the shift lever, and therefore the mode of operation and/or upshift/downshift desired by the operator.

In the preferred embodiments the in-line gearshift mechanism of the present invention further includes a throttle lever integrally incorporated therewith for enabling the operator to adjust the engine speed of the vehicle. A mounting plate defines limits for the travel of the throttle lever, and is secured to the shifter plate.

In the preferred embodiment the gear encoding plate includes an arm portion adapted to engage a neutral detection switch when the shift lever is in the neutral position. This allows an external controller to de-energize other components of the transmission and/or vehicle if it is desirable to do so while the transmission is in neutral.

In a preferred embodiment of the invention a computer program is also included for determining if a reverse downshift is actually intended by the operator when the operator moves the shift lever into the reverse downshift position, to thus distinguish between instances where the shift lever is merely moved through this position when shifting from the reverse or neutral modes of operation. The computer program likewise determines if a forward downshift was actually intended by the operator when the operator moves the shift lever between the forward position and the neutral position. Thus, unwanted downshifts in either the reverse or forward modes of operation are prevented and only downshifts desired by the operator are initiated by the gearshift mechanism of the invention. Still further, the program determines if a forward upshift or reverse upshift was actually intended by the operator or was inadvertently signalled by the gearshift lever into either forward or reverse modes of operation, and inhibits the upshift if it determines that the upshift was inadvertent.

BRIEF DESCRIPTION OF THE DRAWINGS

The various advantages of the present invention will become apparent to one skilled in the art by reading the following specification and subjoined claims and by referencing the following drawings in which:

FIG. 1 is perspective view of the in-line gearshift mechanism of the present invention;

FIG. 2 is a top view of the indicia plate denoting the forward upshift, forward, forward downshift, neutral, reverse downshift, reverse and reverse upshift positions, as well as the engine speed associated with positioning of the throttle lever;

FIG. 4 is a side view of the shift lever assembly of the present invention;

FIG. 5 is a rear view of the shift lever assembly of FIG. 4 in accordance with directional line 5—5 in FIG. 4;

FIG. 6 is a side view of the shifter plate of the present invention;

FIG. 7 is a side view of the switch assembly plate showing the plurality of reed switches thereon and the connector for outputting the signals generated by the reed switches in response to movement of the shift lever assembly;

DETAILED DESCRIPTION OF THE PREFERRED EMBODIMENT

Figure 3:
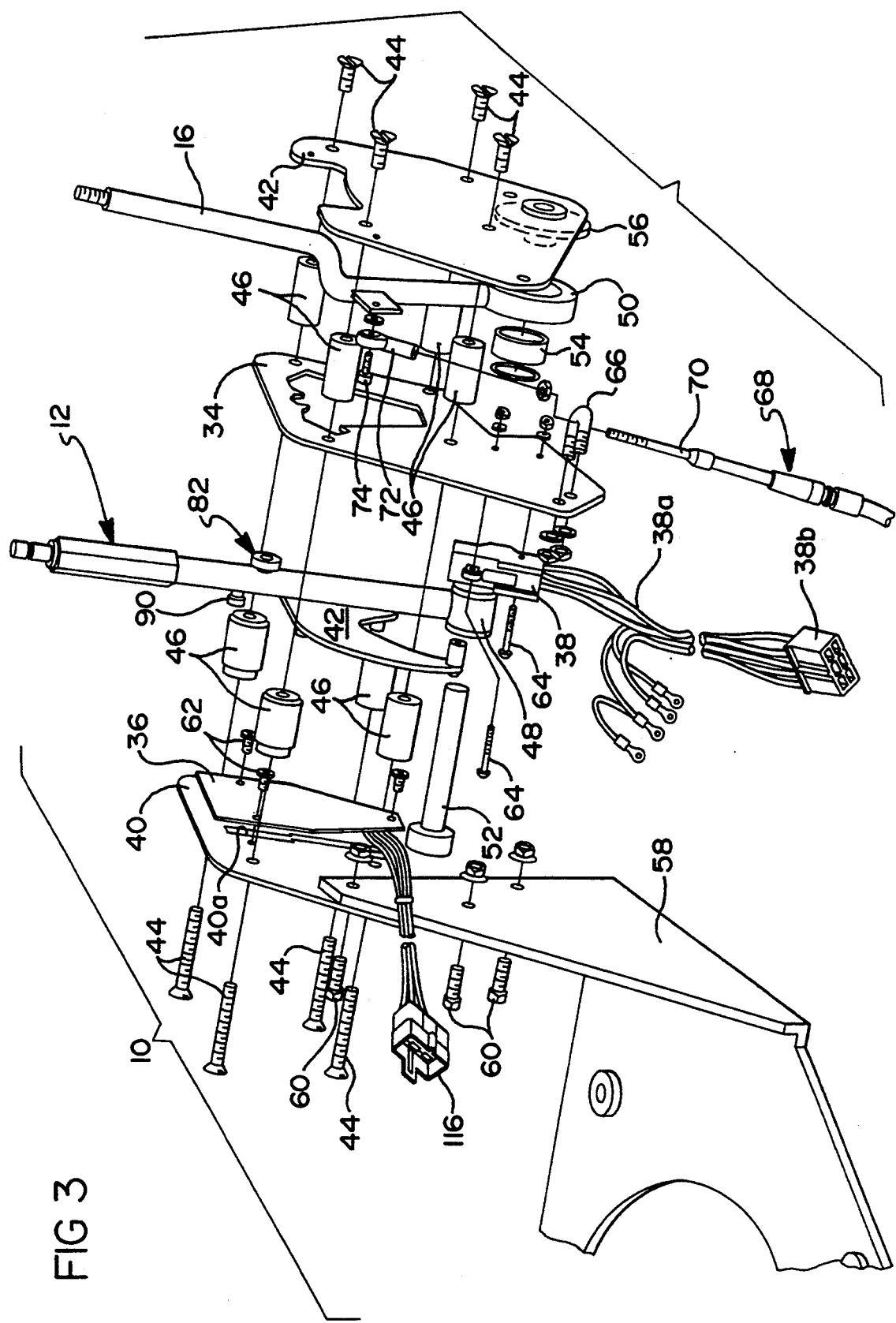
FIG. 3 is an exploded perspective view of the component parts of the in-line gearshift mechanism of FIG. 1.
Figure 8:
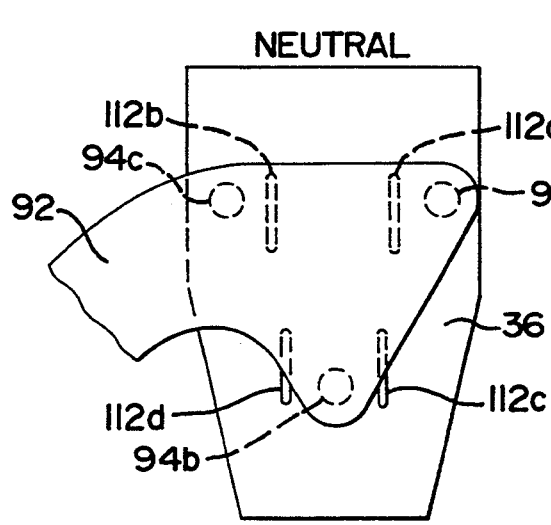
FIG. 8 is an illustration of the switch assembly plate showing the positions of the switch activating elements relative to the reed switches when the shift lever assembly is in the neutral position.

Referring to FIG. 1, there is shown an apparatus forming an in-line gearshift mechanism 10 in accordance with a preferred embodiment of the present invention. The gearshift mechanism 10 generally includes a shift lever assembly 12 having a hand grip portion 12a, and is fixedly secured to a frame portion 14 of an interior of a vehicle such as an agricultural tractor. The mechanism 10 also optionally includes a throttle lever 16 for allowing an operator to set the speed of an engine of the vehicle at a desired speed. With brief reference to FIG. 2, a top indicia plate 18 partially closes off an interior area of the mechanism 10 and provides indicia for denoting positions associated with forward (F) 20, neutral (N) 22 and reverse (R) 24 modes of operation of the transmission of the vehicle, as well as positions of forward upshift (F+) 20a, forward downshift (F−) 20b, reverse downshift (R−) 24b and reverse upshift (R+) 24a. As will be described more fully hereinafter, all of the shifting of the gearshift mechanism 10 is accomplished in an "in-line" fashion without any perpendicular movement of the shift lever assembly 12.

With further brief reference to FIG. 1, in the preferred embodiment the mechanism 10 includes a power front axle (PFA) switch 26 and a differential lock switch 28. The PFA switch 26 has been illustrated in the form of a rocker-type switch, but it will be appreciated that a wide variety of other type switches could also be used. With PFA switch 26, depressing the top most portion 26a of the switch causes a power front axle of the vehicle to engage. Conversely, depressing the lowermost portion 26b of the switch 26 causes the powerfront axle to be disengaged. Momentarily depressing switch 28 causes an hydraulic differential lock of the vehicle to be engaged. It should also be appreciated that switches 26 and 28 could be located at a wide variety of other locations within a cabin area of an agricultural vehicle. However, they are particularly easily accessible when positioned near the shift lever assembly 12 as shown in FIG. 1.

With further reference to FIG. 2, the top indicia plate 18 further includes indicia 30 designating the engine speed which corresponds to placement of the throttle lever 16. Also, an elongated, longitudinal slot 32 is formed in the top indicia plate 18 to allow a portion of the gearshift lever assembly 12 to protrude therethrough. As will be described more fully hereinafter, all shifting is accomplished in an "in-line" fashion without any perpendicular movement of the gearshift lever assembly 12 relative to the elongated slot 32.

Referring now to FIG. 3, an exploded perspective view of the components of the apparatus 10 is shown. The apparatus 10 generally comprises the shift lever assembly 12 (without the hand grip portion 12a), a shifter plate 34 and a switch assembly plate 36. As stated previously, in the preferred embodiment the apparatus 10 includes the throttle lever 16, and furthermore a neutral detection limit switch 38 coupled via a plurality of conductors 38a to a suitable electrical connector terminal 38b. Each of the shifter plate 34, shift lever assembly 12 and switch assembly plate 36 are held in assembled relation between a first shifter case mounting plate 40 and a second shifter case mounting plate 42 via a plurality of threaded screws 44 and a corresponding plurality of spacers 46. The spacers 46 maintain the first shifter case mounting plate 40 and the shifter plate 34 a predetermined distance apart, as well as maintain the second shifter case mounting plate 42 and the shifter plate 34 a predetermined distance apart.

With further reference to FIG. 3, the shift lever assembly 12 includes an annular end portion 48. The throttle lever 16 similarly includes an annular end portion 50. Each of the annular end portions 48 and 50 are kept in longitudinal alignment and mounted for rotational movement about a main shaft 52 which is fixedly secured to the first shifter case mounting plate 40, and which extends through the annular end portion 48, through a spacer 54, through the annular end portion 50, and into a threaded mounting nut 56 fixedly secured to the second shifter case mounting plate 42.

With continued reference to FIG. 3, the first shifter case mounting plate 40 includes a pair of output portions 40a (only one of which is visible) and is secured to a frame portion 58 of an interior portion of the vehicle by a plurality of screws 60. The frame portion is preferably part of an operator console which is secured to the seat assembly of the vehicle such that fore and aft adjustment of the seat also causes fore and aft positioning adjustment of the gearshift mechanism 10. The switch assembly plate 36 is similarly secured via a plurality of screws 62 to the first shifter case mounting plate 40. The neutral detection switch 38 is secured to the shifter plate 34 via a pair of threaded screws 64. Also secured to the shifter plate 34 is a U-bolt which secures a portion of a throttle cable 68 thereto. An interior cable 70 of the throttle cable 68 is secured via a rod end bearing 72 to the throttle lever 16 via a threaded screw 74.

With reference now to FIGS. 4 and 5, the shift lever assembly 12 will be described in more detail. The shift lever assembly 12 includes an elongated detent rod 76 which is disposed within a tubular main body portion 78 having a shoulder portion 78a. A button 12b having a bottom edge 12d is frictionally coupled to the detent rod 76 by an O-ring 12c. The tubular main body portion 78 is fixedly secured such as by welding, brazing or any other suitable means of attachment to the annular end portion 48. The tubular main body portion 78 includes an elongated slot 80 extending completely through a portion of the main body portion 78, and through which protrudes a portion of a roller assembly 82 fixedly secured to the detent rod 76. The roller assembly 82 includes an outer wheel portion 84 which is supported on an internal bearing (not shown), thus allowing the outer wheel portion 84 to rotate relative to the detent rod 76. The outer roller portion 84 is preferably covered with some form of tape or foam to somewhat cushion the feel of the shift lever assembly 12 during shifting. The detent rod 76 is further biased upwardly away from the annular end portion 48 by a spring 86 disposed within a lower end portion 88 of the tubular main body portion 78. The roller assembly 82 is limited in its upward movement by a stop member 90 which also helps to prevent rotation of the detent rod 76. The stop member 90 is also secured to the detent rod 76 and moves therewith as the detent rod 76 is pressed and released.

Further secured to the main body portion 78 of the shifter assembly 12 is a gear encoder plate 92. The gear encoder plate 92 includes a plurality of switch activating elements 94a, 94b and 94c in the form of magnets positioned at precise locations thereon and fixedly secured thereto. The gear encoder plate 92 further includes an arm portion 96 having a spacer 98 fixedly secured at an outermost end portion 100. The spacer 98 engages the neutral detection limit switch 38 when the gearshift assembly 12 is in the neutral position. This will be explained more fully momentarily. By pressing down on the detent rod 76 at its upper end portion 102, the detent rod 76 is moved downwardly against the biasing force of the spring 86. At the same time the roller assembly 82 moves downwardly with the detent rod 76. When the operator releases the detent rod 76 it is urged upwardly by the biasing force of the spring 86 until it contacts the stop member 90.

With brief reference to FIG. 5, the shifter assembly 12 is shown in a rear view. From this view it can be clearly seen that the switch activating elements 94a, 94b and 94c (with element 94a being hidden behind element 94c) protrude clearly outwardly of the gear encoder plate 92.

Referring now to FIGS. 3 and 6, the shifter plate 34 will be described. The shifter plate 34 includes an opening 104 having a neutral (N) detent position 106, a reverse (R) detent position 108 and a forward (F) detent position 110. A reverse downshift (R−) detent position 108a and a reverse upshift (R+) detent position 108b, which each effectively form positive stop positions, are formed on opposite sides of the reverse detent position 108. Guide portions 108c and 108d are also provided on each side of the reverse detent position 108. Similarly, a forward downshift (F−) detent position 110a and a forward upshift (F+) detent position 110b, which also each effectively from positive stop positions, are formed on opposite sides of the forward detent position 110. These detents are further separated by guide portions 110c and 110d. The neutral detent position 106 further includes a pair of arm portions 106a$_1$ and 106a$_2$ and ramp portions 107a and 107b each associated with a respective one of the arm portions 106a$_1$ and 106a$_2$. Edge portions 110e and 108e are also formed near each of the forward upshift 110b and reverse upshift 108b positions. Accordingly, the forward, neutral and reverse modes of operation, as well as the positions for upshifting and downshifting in either forward or reverse modes of operation, are all positioned in-line.

The neutral detent position 106, in effect, functions as a "lock" to positively maintain the roller assembly 82 therein when the detent rod 76 is not being engaged by the operator and the shift lever assembly 12 is positioned in the neutral position 22 (FIG. 2) of the indicia top plate 18. Thus, the operator cannot move the shift lever assembly 12 out of the neutral position without first pressing the detent rod 76. This feature will be explained more fully momentarily in connection with the operation of the gearshift mechanism 10.

Referring now to FIGS. 3 and 7, the switch assembly plate 36 will be described. Switch assembly plate 36 includes a plurality of switch elements 112a, 112b, 112c and 112d secured at precise positions thereon. Each of the switches 112a–112d is coupled to an external controller (not shown) via a wiring assembly 114 and an electrical terminal connector 116. In the preferred embodiment each of the switch elements 112a–112d comprises a normally open reed switch which closes when one of the switch activating elements 94a–94c (FIG. 5) is positioned over or closely adjacent thereto. The reed switches 112a–112d generate a signal representative of the position of the shift lever assembly 12 which is transmitted to an external controller to inform the controller of the desired shifting operation. The cutouts 40a in the first shifter case mounting plate 40 have been illustrated in phantom to show how they are positioned to lie over the reed switches 112a–112d. In this manner any magnetic field of the mounting plate 40 does not affect the operation of the reed switches 112a–112d.

Referring now to FIGS. 3, 4, 6 and 7 the operation of the gearshift mechanism 10 will be described. When in the neutral position, the roller assembly 82 is disposed in the neutral detent (i.e., lock) position 106 as shown in FIG. 6. The roller assembly 82 is further held in this position by the combination of the upward biasing force provided by the spring 86 (FIG. 4) and the shoulder portions 106a$_1$ and 106a$_2$. Accordingly, the shift lever assembly 12 cannot be moved inadvertently from this position without the operator first depressing the detent rod 76 to cause the roller assembly 82 to clear one of the arm positions 106a$_1$ or 106a$_2$. Conversely, however, the ramp portions 107a, 107b allow the roller assembly 82 to be urged quickly and smoothly over the arm portions 106a$_1$, 106a$_2$ into neutral without first depressing the detent 76, to thus enable a very quick and easy shift into neutral if an urgent condition requires such a shift. In the neutral position the neutral detection limit switch 38 (FIG. 3) is also engaged by the spacer 98 of the arm portion 96, thus generating an appropriate signal to the connector terminal 38b.

Figure 9:
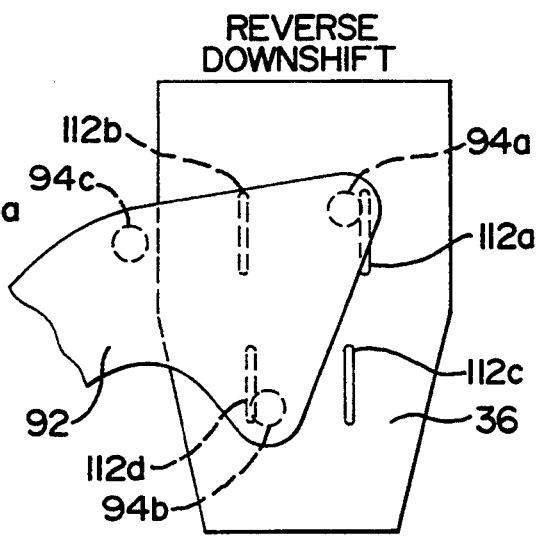
FIG. 9 is an illustration of the positions of the switch activating elements when the shift lever assembly is in the reverse downshift position.

Referring to FIGS. 3, 6 and 9, when the operator fully depresses the detent rod 76 and subsequently pulls the shift lever assembly 12 towards the reverse detent position 108, the roller wheel 84 will "bump" the arm portion 106a$_1$ momentarily, before clearing the arm portion 106a$_1$ and pass into the reverse downshift detent position 108a as shown in FIG. 6. The operator may then release the detent rod 76 whereby the force of the spring 86 (FIG. 4) will urge the roller wheel 84 along guide portion 108c into the reverse detent position 108. The momentary bump of the arm portion 106a$_1$ provides the operator with a tactile feedback signal to inform him/her that the shift lever is being moved out of the neutral detent (i.e., lock) position 106. Once the roller wheel 84 is in the reverse detent position 108, subsequent movement of the shift lever assembly 12 by the operator to the reverse downshift position 108a, and holding the shift lever assembly 12 at detent position 108a, momentarily, causes a reverse downshift to be executed. To reverse downshift further, the operator either returns the shift lever assembly 12 to the reverse detent position 108 and again moves the shift lever assembly 12 into the reverse downshift detent position 108a or simply holds the shift lever assembly 12 in the reverse downshift detent position 108a. In the latter instance, a suitable software program could implement successive reverse downshifts every, for example, 500 ms—1 second, while the shift lever assembly 12 is held in the reverse downshift detent position 108a. Further downshifts in the reverse mode may alternatively be accomplished by repeating the former above-described procedure of moving the shift lever assembly 12 between the reverse 108 and reverse upshift 108a detent positions. Accordingly, a "ratcheting" mode of shifting is provided wherein successive downshifting in the reverse mode is accomplished by simply moving the shift lever assembly 12 between the reverse detent position 108 and the reverse downshift detent position 108a repeatedly until the desired reverse gear is reached. The guide portion 108c of the opening 104 ensures that if the operator inadvertently or accidentally removes his/her hand from the shift lever assembly 12 that the shift lever assembly 12 will be biased back into the reverse detent position 108.

The edge portion 108e is adapted to contact the roller assembly 82 if same is in a fully "down" position by virtue of complete depression of the detent rod 76. Thus, if the operator should shift out of the neutral detent position 106 into the reverse detent position 108, and overshoot position 108, the edge portion 108e prevents the shift lever assembly 12 from entering the reverse upshift detent position 108b, and thus an unwanted reverse upshift from being inadvertently signalled by the operator. Accordingly, it will be appreciated that the distance of travel allowed the detent rod 76 by the fixed shoulder portion 78a (FIG. 4) before same contacts the bottom edge 12d of the button 12b is such as to allow the roller assembly 82 to almost entirely clear the arm portions 106a$_1$ and 106a$_2$ when the detent rod 76 is fully depressed, and the length of the elongated slot 80 is such as to allow the detent rod 76 to be further depressed (i.e., withdrawn) slightly by abutting contact of the roller assembly 82 against the arm portion 106a$_1$ and against the biasing force of the spring 86 (FIG. 4).

With further reference to FIGS. 3 and 6, when a reverse upshift is desired the operator pulls the shift lever assembly 12 from the reverse detent position 108 into the reverse upshift detent position 108b. Holding the shift lever assembly 12 momentarily at position 108b causes a reverse upshift to be initiated. To cause further reverse upshifts, the operator returns the shift lever assembly 12 to the reverse detent position 108 and then again pulls it back into the reverse upshift position 108b. Further reverse upshifts are executed by simply moving the shift lever assembly 108 in an in-line fashion repeatedly between the positions 108 and 108b. Alternatively, successive reverse upshifts may be accomplished by simply holding the shift lever assembly 12 in the reverse upshift position wherein a software program would implement successive reverse upshifts as described hereinbefore. Guide portion 108d functions in connection with the biasing force provided by the spring 86 (FIG. 4) to urge the roller wheel 84 into the reverse detent position 108 should the operator remove his/her hand from the shift lever assembly 12.

With further reference to FIGS. 4 and 6, when the operator desires to shift into the forward mode of operation he/she presses the detent rod 76 at the upper end portion 102 (FIG. 4) and subsequently pushes forwardly on the shift lever assembly 12, thus urging the roller wheel 84 over the shoulder portion 106$a_2$ (FIG. 6). This generates a tactile signal to the operator that the neutral position 106 is being exited. The biasing force of the spring 86, in connection with guide portion 110c, urges the roller assembly 82 into the forward detent position 110 should the operator release the shift lever assembly 12 before reaching detent position 110. When forward downshifting, the operator merely pulls back on the shift lever assembly 12, thus urging it from the forward detent position 110 momentarily into the forward downshift detent position 110a, and then returns the shift lever assembly 12 to the forward detent position 110. Further forward downshifting is accomplished by alternately pulling the shift lever assembly 12 back into the forward downshift detent position 110a and returning the shift lever assembly 12 to the forward detent position 110.

If forward upshifting is desired, the operator merely pushes forwardly on the shift lever assembly 12 from the forward detent position 110 until the roller wheel 84 engages the forward upshift detent position 110b, and then brings the shift lever assembly 12 back to the forward detent position 110. Further upshifts in the forward mode are accomplished by alternately pushing the shift lever assembly 12 to the forward upshift detent position 110 and returning the shift lever assembly 12 back into the forward upshift detent position 110. Successive forward upshifting and forward downshifting can also be accomplished by simply holding the shift lever assembly 12 in the desired position and a suitable software program, such as mentioned hereinbefore, used to implement successive upshifts or downshifts in accordance with a software timer which implements upshifts or downshifts (e.g., every 500 ms—1 second) while the shift lever assembly 12 is held at the desired position. The guide portion 110d, together with the biasing force of the spring 86 (FIG. 4), causes the roller wheel 84 to be urged into the forward detent position 110 from the forward upshift detent position 110b should the operator simply release the shift lever assembly 12 while same is in the forward upshift detent position 110b.

If the operator shifts toward the forward detent position 10 from the neutral detent (i.e., lock) position 106 with the detent rod 76 fully engaged (i.e., depressed), the edge portion 110e prevents the roller assembly from being inadvertently moved into the forward upshift position 110b. Finally, if the operator moves the shift lever assembly 12 between the forward and reverse detent positions 110 and 108, respectively, the arm portions 106$a_1$ and 106$a_2$ provide a double bump to the shift lever assembly 12, thus tactilely signalling the operator that he has passed through the neutral detent (i.e., lock) position 106.

From the above, it should be appreciated that shifting between the forward, neutral and reverse modes of operation, as well as upshifting and downshifting in each of the forward and reverse modes, is accomplished in an in-line fashion with no movement of the shift lever assembly 12 perpendicular to the shifter plate 34. This form of shifting causes significantly less operator fatigue over prolonged periods where an operator may be required to shift between various modes of operation, as well as between various forward and reverse gears to accomplish a desired task.

It should also be appreciated that the time delays implemented via a suitable software program preferably vary somewhat for shifts in various gears. More specifically, it has been found that a slightly longer overall time delay, preferably around 750 ms–850 ms, has been found to work well with shifts between forward gears 9–18 of a powershift transmission. Conversely, it has been found that overall shift time delays of about 400 ms–600 ms are preferred for shifts in forward gears 1–9 and reverse gears 1–9 of a powershift transmission. This is because engine speeds are typically higher in forward gears 9–18 and lower in forward gears 1–9 and reverse gears 1–9. The lower engine speeds make a shorter time overall delay preferable so that engine torque does not have a chance to drop while shifting between forward gears 1–9 or reverse gears 1–9.

Referring now to FIGS. 6 and 8–11, the positions of the switch activating elements 94a–94c relative to the reed switches 112a–112d (FIG. 7) on the switch assembly plate 36 is illustrated as the shift lever assembly 12, and thus the gear encoder plate 92, is moved from the neutral detent position 106 to the reverse upshift detent position 108b. With initial reference to FIG. 8, when in the neutral detent position 106 switch elements 94a–94c are in the positions shown relative to the reed switches 112a–112d. Thus, all of the reed switches are open. In this mode none of the switch activating elements 94a–94c are positioned over any of the reed switches 112a–112d.

Referring to FIG. 9, as the operator moves the shift lever assembly 12 into the reverse downshift detent position 108a from the reverse detent position 108, switch activating element 94a is positioned closely adjacent reed switch 112a and switch activating element 94b is positioned closely adjacent reed switch 94d, thus closing these reed switches. An appropriate signal is then generated by reed switches 112a and 112d from which the external controller is informed of the position of the shift lever assembly 12.

Figure 10:
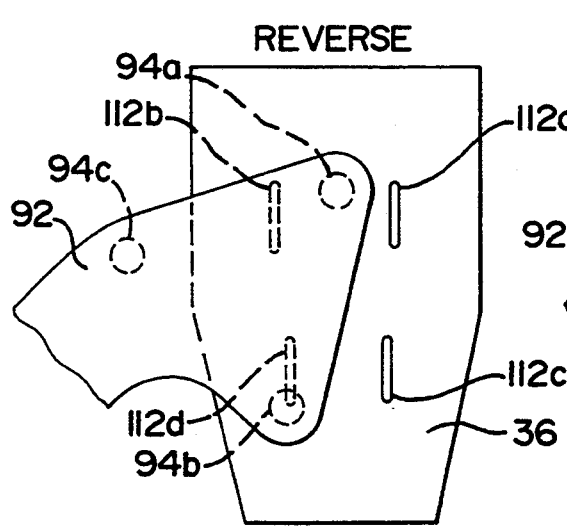
FIG. 10 is an illustration of the positions of the switch activating elements when the shift lever assembly is in the reverse position.
Figure 11:
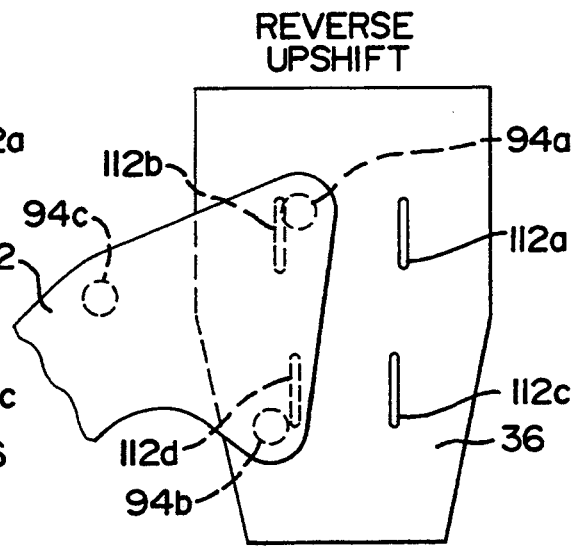
FIG. 11 is an illustration of the positions of the switch activating elements when the shift lever assembly is in the reverse upshift position.

When the shift lever assembly 12 is placed in the reverse detent position 108, the switch activating elements 94a–94c are positioned as shown in FIG. 10. In this position element 94b activates the reed switch 112d, thus generating a signal to the terminal connector 116 (FIG. 7) informing of the position of the shift lever assembly 12 in the reverse detent position 108. Further movement of the shift lever assembly 12 into the reverse upshift detent position 108b places the switch activating elements 94a–94c in the positions shown in FIG. 11. In this position element 94a activates reed switch 112b, while element 94b activates reed switch 112d, thus causing a signal to be generated at the terminal connector 116 informing of the position of the shift lever assembly 12 in the reverse upshift detent position 108b.

Figure 12:
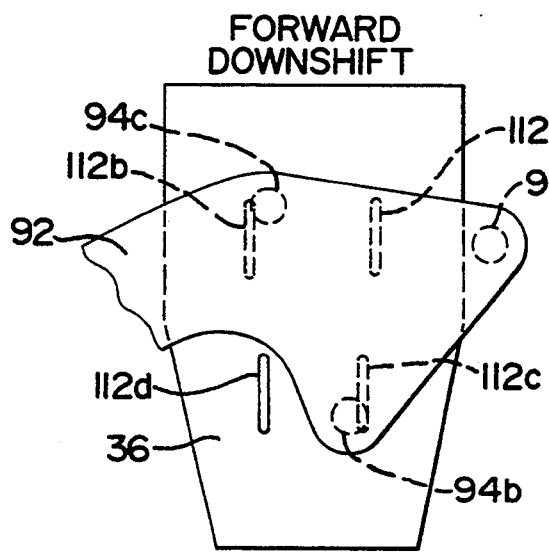
FIG. 12 is an illustration of the positions of the switch activating elements when the shift lever assembly is in the forward downshift position.
Figure 13:
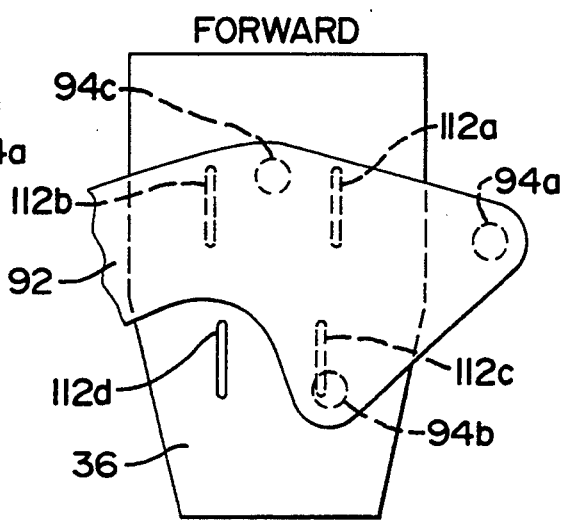
FIG. 13 is an illustration of the positions of the switch activating elements when the shift lever assembly is in the forward position.
Figure 14:
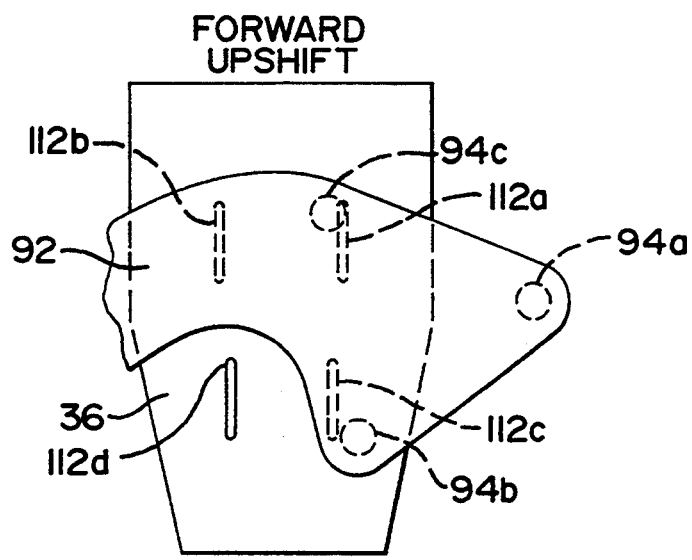
FIG. 14 is an illustration of the positions of the switch activating elements when the shift lever assembly is in the forward upshift position.

Referring now to FIGS. 6 and 12–14, when the operator moves the shift lever assembly 12 into the forward downshift detent position 110a from the forward detent position 110, the switch activating elements 94a–94c are positioned relative to the reed switches 112a–112d as shown in FIG. 12. In this position reed switches 112a and 112c are activated (i.e., closed) to thus generate a signal informing of the position of the shift lever assembly 12 in the forward downshift detent position 110a. When the shift lever assembly 12 is moved into the forward detent position 110, the switch activating elements 94a–94c are positioned as shown in FIG. 13. Switch activating element 94b is positioned over the reed switch 112c, thus causing the switch 112c to generate a signal informing that the shift lever 12 has been placed in the forward detent position 110. Further forward movement of the shift lever assembly 12 into the forward upshift detent position 110b causes the switch activating elements 94a–94c to be positioned as shown in FIG. 14. Elements 94b and 94c are positioned closely adjacent the reed switches 112a and 112c, respectively, thus closing switches 112a and 112c. This causes the switches 112a and 112c to generate a signal informing of the position of the shift lever assembly 12 in the forward upshift detent position 110b. In the following table, "X"'s denote which of the switches 112a–112d are activated by the switch activating elements 94a–94c as the shift lever assembly 12 is moved between its various positions.

TABLE 1

|     | Neutral Detection SW | SW 112a | SW 112b | SW 112c | SW 112d |
| --- | --- | --- | --- | --- | --- |
| F+  |   | X |   | X |   |
| F   |   |   |   | X |   |
| F−  |   |   | X | X |   |
| N   | X |   |   |   |   |
| R−  |   | X |   |   | X |
| R   |   |   |   |   | X |
| R+  |   |   | X |   | X |

While the preferred embodiments of the invention have been described in connection with an agricultural vehicle, it will be appreciated that the apparatus 10 could just as easily be used with little or no modification with other vehicles such as heavy earth moving equipment, where frequent shifting is necessary. Also, while the apparatus 10 has been illustrated as including a plurality of reed switches and magnets for actuating the reed switches, a variety of other forms of mechanical or electronic switches may be substituted therefor.

While the in-line shifting of the shift lever assembly 12 is expected to significantly simplify the shifting procedures for controlling a powershift transmission in certain situations, such as when the operator is shifting from forward into neutral or from reverse into neutral, a downshift may be unintentionally commanded by the operator when the operator does not wish to perform a downshift. However, since a shift from either forward or reverse modes into neutral causes the shift lever assembly 12 to pass through either the forward downshift or reverse downshift shift positions, some means must be provided to insure that a forward downshift or a reverse downshift is performed only at times when the operator actually desires such.

Also, since the in-line shifting of the apparatus 10 allows for very rapid movement of the shift lever assembly 12 into either the forward or reverse modes, and since the shift lever assembly 12 itself has some inertia when pushed very quickly into the forward position or pulled very quickly into the reverse position, some means is desirable for determining if a forward upshift is in fact desired by the operator if the operator should push the shift lever assembly 12 into the forward position and release the detent rod 76, to thereby "overshoot" this position momentarily, thus placing the shift lever for a very brief moment in the forward upshift position. Similarly, means is desirable for determining if a reverse upshift is in fact intended by the operator if the operator should pull the shift lever assembly 12 very quickly from neutral into reverse and release the detent rod 76, to thus overshoot the reverse position, thus placing the shift lever assembly 12 momentarily (and unknowingly) in the reverse upshift position.

In accordance with the preferred embodiment of the present invention, a program 118 is provided in FIGS. 15–20 for determining if reverse downshifts and forward downshifts are to be executed when the reed switches 112a–112d corresponding to these shifts are actuated. The program 118 also determines if momentary placement of the shift lever assembly 12 in either the forward upshift, reverse upshift, forward downshift or reverse downshift positions was due to unintentional overshoot of either the forward or reverse positions by the operator or by the inertia of the switch assembly 12 itself during an upshift or a downshift.

Figure 15:
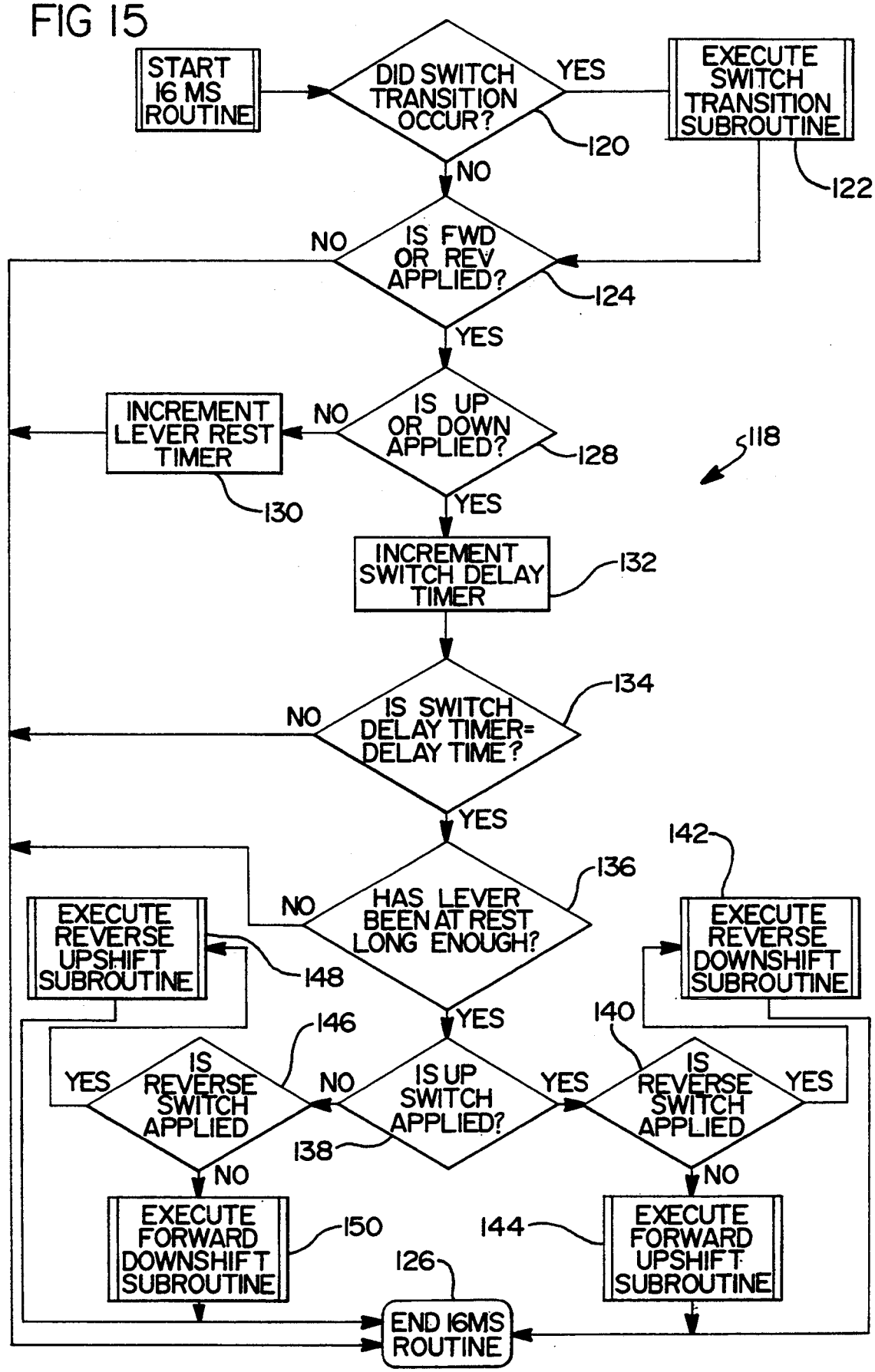
FIG. 15 is a flowchart of the steps of a computer program used to determine if a reverse downshift or a forward downshift is intended when the operator moves the shift lever assembly through those positions.

Referring initially to FIG. 15, the program 118 essentially comprises a switch transition subroutine which is executed periodically by an external controller operating in connection with the powershift transmission of the vehicle. The program 118 is executed preferably about every 16 milliseconds. When the program 118 is entered, a check is made to determine if any of the reed switches 112a–112d or the neutral detection limit switch 38 has just had a state transition (i.e., either transitioned from on to off or from off to on), as indicated at step 120. If so, a switch transition subroutine 122 is executed. If none of the just-mentioned switches has transitioned, a check is made to determine if reed switch 112d or reed switch 112c is closed (i.e., activated), thus indicating that the shift lever assembly 12 is in one of the reverse downshift, reverse, reverse upshift, forward downshift, forward or forward upshift positions, as indicated at step 124. If neither reed switch 112c or switch 112d is closed, the program 118 is exited as indicated at step 126. Essentially, a "no" determination at step 124 tells the external controller that the shift lever assembly 12 is in the neutral position and has been so for at least more than a brief period of time.

If the test at step 124 determines that either reed switch 112c or reed switch 112d is presently closed, then a determination is made as to whether reed switch 112a or reed switch 112b is also closed, as indicated at step 128. If this test proves false, then a lever rest timer is incremented, as indicated at step 130. The lever rest timer is a timer which keeps track of how long the shift lever assembly 12 has been at rest in either the forward or reverse modes. As will be explained more fully momentarily, the lever rest timer is used to prevent either an upshift or a downshift from being executed for a predetermined minimum time of about 250 ms immediately after the shift lever assembly 12 has been moved into either the forward or reverse positions from the neutral position. This allows the operator sufficient time to place or "find" the forward or reverse positions when moving the shift lever assembly 12 into either of these positions from the neutral position and prevents signals from transiently closed reed switches 112a and 112b from being acted on by the external controller unless such signals are generated after the lever has been at rest for at least about 250 ms. Without the lever rest timer, if the operator moved the shift lever assembly 12 briefly just past the forward or reverse positions from the neutral position, or fell just short, temporarily, of moving the shift lever assembly 12 into either the forward or reverse positions, a forward downshift or reverse downshift, respectively, might be signalled by the reed switches 112a–112d. Once the lever rest timer is initiated (indicating the shift lever assembly 12 is at rest in the forward or reverse position) the program 118 is exited as indicated at step 126.

If the test at step 128 has indicated that either reed switch 112a or reed switch 112b is closed, a shift delay timer is incremented as indicated at step 132. This timer provides a time delay of preferably about 100 milliseconds which has been determined to be the approximate maximum "bounce" time that is anticipated should the operator "slap" or otherwise very quickly push or pull the shift lever assembly 12 into either the forward upshift or forward downshift positions, respectively, from the forward position, or slap the shift lever assembly 12 into the reverse downshift or reverse upshift positions from the reverse position. Essentially, this time delay causes very momentary closing of any of the reed switches 112a–112b to be ignored if the shift lever assembly 12 is "slapped" by the operator into an upshift or downshift positions from either the forward or reverse positions. Accordingly, the unintended actuation of reed switches 112a or 112b caused by the inertia of the shift lever assembly 12 itself if same is slapped or very quickly pushed or pulled by the operator, which would otherwise cause the shift lever assembly 12 to travel past the forward or reverse position when returning from a "slap" shift into either an upshift or downshift position, is ignored.

After the shift delay timer is incremented at step 132, a test is made to determine if the shift delay timer has reached the predetermined delay time of approximately 100 ms, as indicated at step 134. If this test proves false, then the program 118 is exited at step 126. This prevents upshifts and downshifts in either the forward or reverse modes to be implemented even if either of reed switches 112a or 112b has been turned on before the 100 ms time delay period has expired.

If the test at step 134 proves true, another test is made at step 136 to determine if the shift lever assembly 12 has been at rest for the approximate 250 ms time delay period provided by the lever rest timer (initiated at step 130). If this test proves false, the assumption is that the closing of the reed switches 112a or 112b to signal an upshift or a downshift in either the forward or reverse modes was merely a "transient" switch closing. Put differently, the assumption is that the operator was merely going through the forward downshift or reverse downshift positions from the neutral position when placing the shift lever assembly 12 into the forward or reverse positions, and that a forward downshift or a reverse downshift was not intended by the operator. In this event, the program is exited at step 126.

If the lever rest timer is timed out (at least 250 ms has passed), the test at step 136 will prove true. This test will prove false if the shift lever assembly 12 has not been at rest long enough (i.e., if the lever rest timer at step 130 has not ben incremented enough to reach a count equal to at least about 250 ms). Thus, this prevents unwanted upshifts when entering either the forward or reverse modes if the operator accidentally moves the shift lever assembly 12 momentarily past either the forward or reverse detent positions 110 and 108, respectively, when shifting from neutral. In this event a check is made to determine if the reed switch 112a is closed, as indicated at step 138. If this test proves true, a further test is made to determine if the reed switch 112d is closed, as indicated at step 140. If reed switches 112a and 112d are closed, then from Table 1 it can be determined that a reverse downshift is being signalled by the reed switches 112a–112d and a reverse downshift subroutine 142 is executed. A discussion of the steps performed in the reverse downshift subroutine 142 will be provided momentarily in connection with FIG. 20.

If the test at step 140 proves false, then from Table 1 it can be seen that the only other shift possibility when the reed switch 112a is closed and when switch 112c or 112d is closed (step 124), is a forward upshift. Accordingly, a forward upshift subroutine 144 is executed which will be explained more fully momentarily in connection with FIG. 17. After performing either the reverse downshift subroutine 142 or the forward upshift subroutine 144 the program 118 is exited at step 126.

If the test at step 138 proves false, then it is assumed that the reed switch 112b is closed (since it was previously determined that the shift lever assembly 12 was not in the neutral position at step 128 and switch 112a or 112b was closed at step 128). In this instance a check is then made to determine if the reed switch 112d is closed, as indicated at step 146. If this test proves true, then from Table 1 it can be determined that a reverse upshift is being signalled and a reverse upshift subroutine 148 is executed, which will be described momentarily in connection with FIG. 18. If the test at step 146 proves false, it can be determined that a forward downshift is being desired (since the shift lever assembly 12 is also not in neutral and the reed switch 112a is also not activated) and a forward downshift subroutine 150 is entered to perform a forward downshift. The forward downshift subroutine 150 will be described momentarily in connection with FIG. 19. After either a reverse upshift or a forward downshift, the program 118 is exited at step 126.

Figure 17:
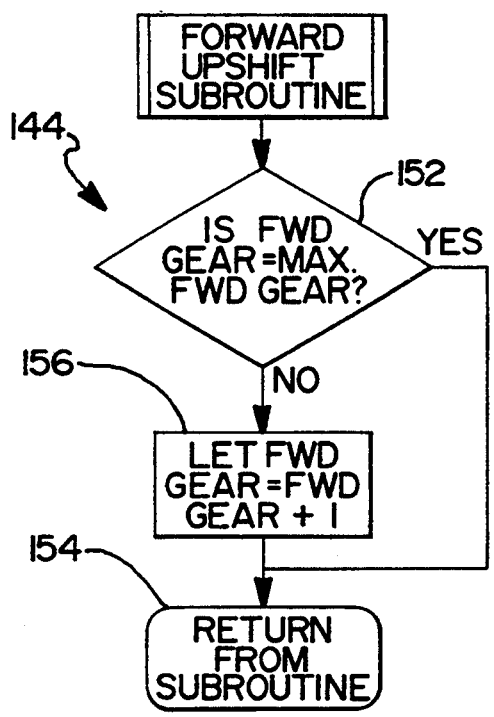
FIG. 17 is a flowchart of the forward upshift subroutine of the program of FIG. 16.

Referring now to FIG. 17, the forward upshift subroutine 144 is shown. When a forward upshift has been legitimately signalled by the reed switches 112a–112d as described in connection with FIG. 15, a test is first made to determine if the previously selected forward gear is equal to the maximum forward gear, as indicated at step 152. It is anticipated that the gearshift mechanism 10 of the present invention will be used in connection with a powershift transmission having numerous forward gears, and preferably about 12 forward gears. If the test at step 152 proves true, then it is known that the current forward gear is already the maximum forward gear, and no further upshift is permitted. Accordingly, the subroutine 144 is executed at step 154. If the test at step 152 proves false, however, then the previously selected forward gear is incremented by one as indicated at step 156, and the subroutine 144 is exited at step 154.

Figure 18:
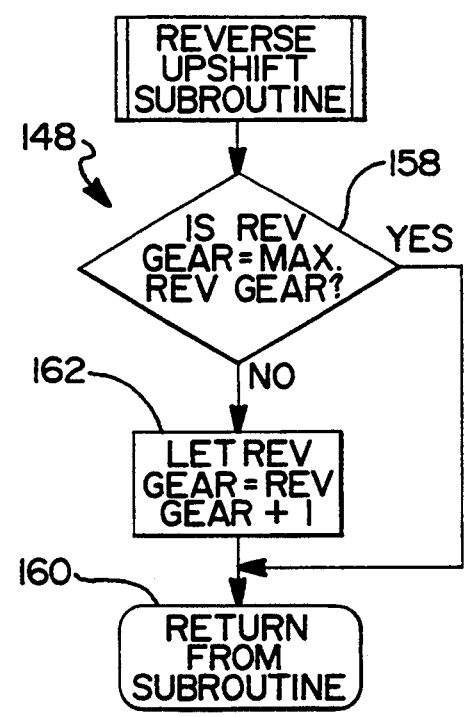
FIG. 18 is a flowchart of the reverse upshift subroutine of FIG. 16.

Referring to FIG. 18, if the reverse upshift routine 148 is to be executed, a check is made to determine if the previously selected reverse gear is equal to the maximum reverse gear, as indicated at step 158. It is anticipated that the powershift transmission to be controlled by the gearshift mechanism 10 of the present invention will include several reverse gears, and preferably six reverse gears. Thus, if the previously selected reverse gear is equal to the maximum reverse gear, no further reverse upshift is permitted and the subroutine 148 is exited at step 160. If the test at step 158 proves false, however, then the previously selected reverse gear is incremented by one, as indicated at step 162, before exiting the subroutine 148 at step 160.

Figure 19:
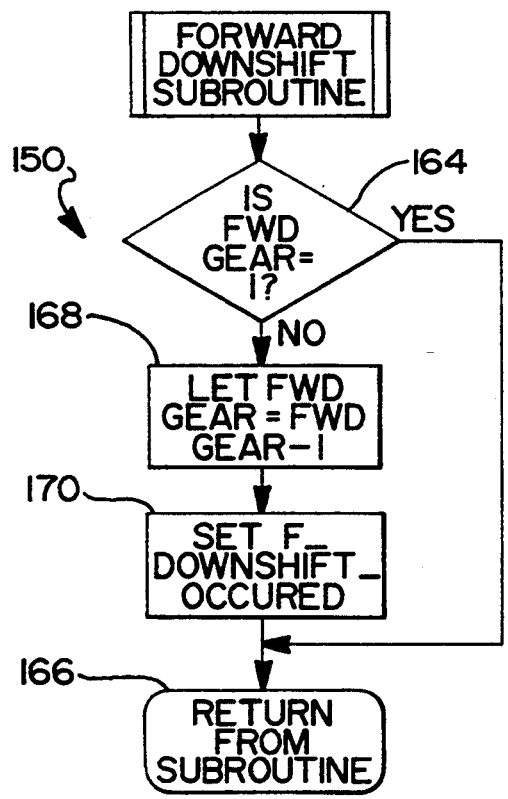
FIG. 19 is a flowchart of the forward downshift subroutine of FIG. 15.

Referring to FIG. 19, if the forward downshift subroutine 150 is to be executed, a check is first made to determine if the previously selected forward gear is the first forward gear, as indicated at step 164. If this test proves true, then no further forward downshifting is permitted and the subroutine 150 is exited at step 166. If the test at step 164 proves false, however, then the previously selected forward gear is decremented by one as indicated at step 168. Subsequently, a "downshift occurred" flag is cleared, which will be described more fully in connection with FIG. 16, as indicated at step 170 before the subroutine 150 is exited at step 166.

Figure 20:
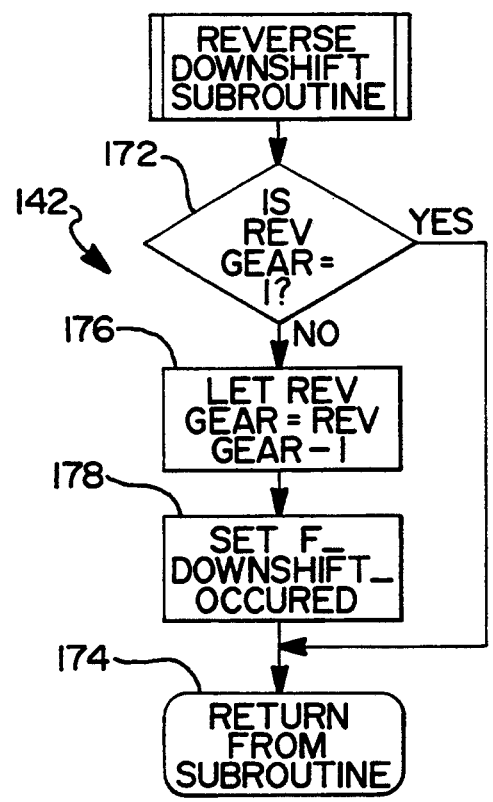
FIG. 20 is a flowchart of the reverse downshift subroutine of FIG. 15.

Referring now to FIG. 20, if the reverse downshift subroutine 142 is to be executed, a test is initially made at step 172 to determine if the previously selected reverse gear is the first reverse gear. If so, no further reverse downshifting is permitted and the subroutine 142 is exited at step 174. If the test at step 172 proves false, however, then the previously selected reverse gear is decremented by one, as indicated at step 176. The downshift occurred flag is then set, as indicated at step 178, thus indicating that a downshift has occurred and the subroutine 142 is exited at step 174.

Figure 16:
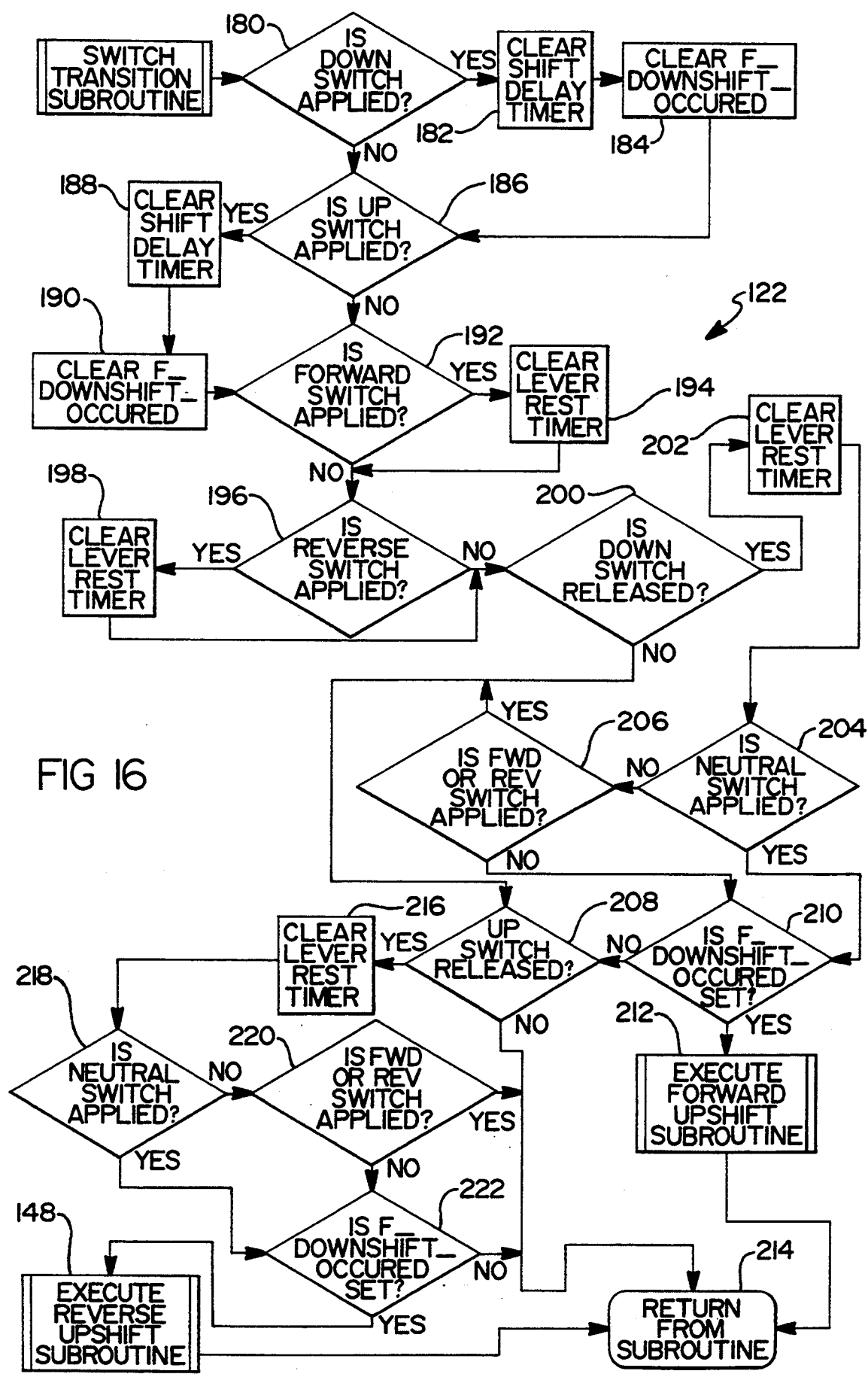
FIG. 16 is a flowchart of a switch transition subroutine of the program of FIG. 15.

Referring now to FIG. 16, if the switch transition subroutine 122 (FIG. 15) is to be executed, thus indicating that one of the reed switches 112a-112d or the neutral detection switch 38 has just transitioned, a test is made to determine if reed switch 112b has just closed, as indicated at step 180. If this test proves true, then the shift delay timer referred to in step 132 (FIG. 15) is cleared, as indicated at step 182. The downshift flag is then cleared at step 184 before another test is made to determine if the reed switch 112a has just closed, as indicated at step 186. If the test at step 186 proves true, the switch delay timer is cleared at step 188 and the downshift occurred flag is cleared at step 190.

Whether the steps at 180 and 186 prove true or false, the forward switch is also checked to determine if it has just closed, as indicated at step 192. If this test proves true, then the lever rest timer is cleared at step 194 before a test is made to determine if the reed switch 112d has just closed, as indicated at step 196. Thus, the test at step 196 is performed whether or not the reed switch 112c has been determined to be closed at step 192. If the test at step 196 proves true, then the lever rest timer is cleared at step 198.

Subsequent to clearing the lever rest timer at step 198 or determining that the test at step 196 is false, the reed switch 112b is checked at step 200 to determine if this switch has just opened. If so, the lever rest timer is then cleared at step 202 before a check is made to determine if the neutral detection limit switch 38 is closed, as indicated at step 204. If the test at step 204 proves false, then a check is made to determine if either one of the reed switches 112c or 112d is closed, as indicated at step 206, to thus definitely determine if the switch lever assembly 12 is in fact in the neutral position. If this test proves true, then a check is made to determine if the reed switch 112a has just opened, as indicated at step 208. If the test at step 204 proves true or the test at step 206b proves false, then a test is made to determine if the downshift occurred flag has been set, as indicated at step 210, thus indicating that a downshift (either in forward or reverse) has been performed.

If this test at step 210 proves false, then the test at step 208 is performed. If the test at step 210 proves true, then it is known that a downshift has just previously taken place during movement of the shift lever assembly 12 from the forward position to the neutral position. In this event the forward upshift subroutine 144 (FIG. 17) is executed, as indicated at step 212. The subroutine 122 then is exited at step 214 and the test at step 124 is made (FIG. 15).

Steps 200, 204 and 210 have been included to restrict downshifts from being implemented when the shift lever assembly 12 moves from the forward to the neutral position. While it is recognized that in rare instances the operator may actually wish to perform a forward downshift when shifting from forward to neutral, it is expected that forward downshifts will, in almost all instances, be desired while operating in the forward mode only and not just prior to a neutral shift. Thus, the subroutine 122 ensures that forward downshifts are only implemented after the operator moves the shift lever assembly 12 back into the forward position from the forward downshift position, and not when the shift lever is moved into the neutral position from the forward downshift position.

With continuing reference to FIG. 16, if the test at step 208 proves true, then the lever rest timer is cleared as indicated at step 216 before making a check to determine if the neutral detection limit switch 38 is closed, as indicated at step 218. If the test at step 218 proves false, then a test is made to determine if either the reed switch 112c or reed switch 112d is closed as indicated at step 220. If the test at step 220 proves true, then from this result, and the positive test at step 208, the subroutine 122 determines that either movement from the reverse downshift position to the reverse position has taken place or that movement from the forward upshift position to the forward position has taken place. Thus, in either event the shift lever assembly 12 has not been moved to or from the neutral position from either the forward or reverse positions. Therefore, no downshift could have occurred. Thus, the subroutine 122 is exited at step 214.

If either the step at 218 proves true or the step at 220 proves false, the downshift occurred flag is checked to determine if it is currently set, as indicated at step 222. If it is not set, then it is determined that a downshift has not occurred during the last movement of the switch lever assembly 12, and the subroutine is exited at step 214. If the test at step 222 proves true, then it is determined that the shift lever assembly 12 has in fact been placed in neutral and that the shift lever assembly 12 has just been moved from the reverse downshift position to the reverse position, and further that an unwanted downshift has occurred. In this event the reverse upshift subroutine 148 is executed to compensate for the unwanted reverse downshift, and to thereby place the transmission in the previously set reverse gear. The subroutine 122 is then exited at step 214 and the program continues at step 124 in FIG. 15.

Steps 208, 218, and 222 thus determine if a reverse downshift has taken place during movement of the shift lever assembly 12 through the reverse downshift position from the reverse position to the neutral position.

While it is also recognized that in rare instances a downshift may be desired by the operator prior to shifting into neutral, it is believed that in the great majority of instances a reverse downshift will only be desired while operating in the reverse mode. Thus, steps 208, 218 and 222 serve to prohibit reverse downshifts from being implemented when shifting from reverse into neutral. If a downshift is signalled by the limit switches 112a and 112d during such movement of the shift lever assembly, then a "compensating" reverse upshift is generated to place the transmission in the previously selected reverse gear. Thus, reverse downshifting is only permitted if the shift lever assembly is moved back into the reverse position after placement in the reverse downshift position.

Thus, by the switch transition subroutine 122, it can be determined if the operator has "slapped" or otherwise very abruptly moved the shift lever assembly 12 unintentionally into either of the upshift or downshift positions while in either of the forward or reverse modes, and the unwanted "transient" shift ignored. It can further be determined if either a reverse downshift or forward downshift has been erroneously signalled by the reed switches 112a–112d by movement of the shift lever assembly 12 through either of these positions when going either from the reverse or forward modes into the neutral mode, or conversely from the neutral mode into either the forward or reverse modes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An in-line gearshift mechanism for enabling an operator to initiate gear selection for a powershift transmission of an agricultural vehicle, said apparatus comprising:
   a shift lever having an operator engageable detent rod movable generally linearly in response to pressure placed thereon by said operator, said shift lever further including a roller coupled to said detent rod and movable linearly with said detent rod, and a gear encoder plate fixedly secured to said shift lever;
      said gear encoder plate including a plurality of switch activating elements positioned thereon;
   a shifter plate means having an opening formed therein, said opening defining a neutral position, and a forward downshift position, a forward position, a forward upshift position, a reverse downshift position, a reverse position and a reverse upshift position, each of said positions further being formed longitudinally in line with one another and adapted to receive said roller as said gearshift lever is moved linearly by said operator;
   a switch plate positioned closely adjacent said gear encoder plate, said switch plate including a plurality of switches thereon responsive to said switch activating elements of said gear encoder plate as said gear encoder plate is moved in response to linear movement of said shift lever, said switches generating control signals indicative of which one of said positions said shift lever is in at a given time to thereby enable said operator to control shifting of said powershift transmission.

2. The mechanism of claim 1, further comprising a throttle lever disposed closely adjacent said shifter plate for enabling said operator to control the speed of an engine of said agricultural vehicle.

3. The mechanism of claim 2, wherein said gear encoder plate includes an arm portion; and
   wherein said apparatus further includes an independent neutral detection switch responsive to said arm portion, said arm portion engaging said neutral detection switch when said shift lever is in said neutral position.

4. The mechanism of claim 2, wherein said shift lever comprises an elongated tubular main body portion within which said detent rod is slidably disposed, said tubular main body portion including an elongated slot formed therein, a portion of said roller extending through said elongated slot and being fixedly secured to said detent rod so as to move linearly with said detent rod as said detent rod is engaged and released by said operator; and
   a spring disposed within a lower end of said main body portion for biasing said detent rod such that said roller is continuously urged away from said spring.

5. The mechanism of claim 1, further comprising a first shifter case mounting plate for supporting said switch assembly plate thereon; and
   a second shifter case mounting plate for supporting said shifter plate thereon.

6. The mechanism of claim 1, wherein said shifter plate further includes first guide portions which operate to direct said roller towards said forward position when said detent rod is disengaged, when said shift lever is released by said operator, and when said roller is in said forward downshift position or said upshift position; and
   wherein said shifter plate includes second guide portions which cause said roller to be directed toward said reverse position when said detent rod is disengaged by said operator, when said shift lever is released, and when said shift lever is in said reverse upshift position or when shift lever is in said reverse downshift position.

7. The mechanism of claim 6, wherein said shifter plate further comprises edge portions formed therein for abuttingly contacting said roller as said shift lever is moved into said forward upshift and said reverse upshift positions.

8. The mechanism of claim 7, wherein said shifter plate includes at least one ramp porion for enabling said roller to be urged into said neutral position from one of said forward or reverse positions without said operator depressing said detent rod.

9. An in-line gear shift mechanism for controlling a powershift transmission of an agricultural vehicle, said gear shift apparatus comprising:
   shift lever means engageable by an operator of said vehicle and movable generally linearly for controlling operation of said powershift transmission;
   said shift lever means including means for forming a detent rod manually engageable by said operator and roller means movable linearly in response to movement of said detent button means, and means forming a gear encoder plate operably associated with said shift lever means and positioned closely adjacent thereto so as to move longitudinally with said shift lever means;

shifter plate means positioned closely adjacent said shift lever means including an aperture means for defining a neutral position, a forward position and a reverse position, each one of said positions being adapted to receive said roller means therein to thereby maintain said shift lever means in any selected one of said positions; and switch assembly plate means positioned closely adjacent said gear encoder plate means for causing a plurality of signals indicative of the position of said shift lever means as said shift lever means is moved linearly relative to said shifter plate means, said signals thereby indicating when said shift lever means is in said neutral, said forward and said reverse positions.

10. The apparatus of claim 9, further comprising a throttle lever disposed closely adjacent said shifter plate means and movable relative thereto for controlling the speed of an engine of said agricultural vehicle.

11. The apparatus of claim 9, wherein said shift lever means further comprises:
   a tubular main body portion within which said detent rod means is slidably disposed;
   said tubular main body portion having an elongated slot formed therein, said roller means partially extending through said elongated slot and being coupled to said detent means to thereby move linearly with said detent means as said detent means is depressed and released by said operator.

12. The apparatus of claim 9, wherein said gear encoder plate means comprises a plurality of switch activating elements protruding therefrom; and
   wherein said switch assembly plate means comprises a plurality of switches responsive to said switch activating elements as said switch activating elements are moved in response to movement of said shift lever means.

13. The apparatus of claim 12, wherein said switch activating elements comprise a plurality of magnets fixed at desired positions on said gear encoder plate.

14. The apparatus of claim 12, wherein said switches comprise reed switches, each being responsive to said switch activating elements.

15. The apparatus of claim 11, wherein said tubular main body portion of said switch lever means comprises a spring therein, said spring operating to bias said detent rod means into an unengaged position when said operator is not engaging said detent rod means.

16. The apparatus of claim 9, wherein said shifter plate aperture means further comprises:
   means for forming a forward downshift detent position in longitudinal alignment with said means for forming a forward detent position;
   means for forming a forward upshift detent position longitudinally in-line with said means for forming a forward detent position;
   means for forming a reverse downshift position longitudinally in-line with said means for forming a neutral detent position; and
   means for forming a reverse upshift detent position longitudinally in-line with said means for forming a neutral detent position.

* * * * *

UNITED STATES PATENT AND TRADEMARK OFFICE
CERTIFICATE OF CORRECTION

PATENT NO. : 5,388,476
DATED : February 14, 1995
INVENTOR(S) : Harger et al.

It is certified that error appears in the above-indentified patent and that said Letters Patent is hereby corrected as shown below:

Column 4, line 22, delete "and".

Column 5, line 31, replace "plate" with --plates--.

Column 13, line 67, replace "ben" with --been--.

In the Claims

Column 18, line 51, Claim 8, replace "porion" with --portion--.

Column 20, line 21, Claim 16, after "plate" delete --aperture--.

Signed and Sealed this

Ninth Day of January, 1996

Attest:

BRUCE LEHMAN

Attesting Officer     Commissioner of Patents and Trademarks